(12) United States Patent
Sinha et al.

(10) Patent No.: US 11,632,316 B2
(45) Date of Patent: Apr. 18, 2023

(54) METHOD AND SYSTEM FOR REPORTING UNAVAILABILITY IN A LABEL-SWITCHED PATH

(71) Applicant: Hewlett Packard Enterprise Development LP, Houston, TX (US)

(72) Inventors: Ankit Kumar Sinha, Bangalore (IN); Anoop Govindan Nair, Bangalore (IN); Parikshit Misra, Bangaluru (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 76 days.

(21) Appl. No.: 17/130,483

(22) Filed: Dec. 22, 2020

(65) Prior Publication Data
US 2022/0200880 A1 Jun. 23, 2022

(51) Int. Cl.
| | |
|---|---|
| *H04L 43/0805* | (2022.01) |
| *H04L 45/50* | (2022.01) |
| *H04L 41/0686* | (2022.01) |
| *H04L 41/40* | (2022.01) |
| *H04L 43/06* | (2022.01) |
| *H04L 43/10* | (2022.01) |

(52) U.S. Cl.
CPC .......... *H04L 43/0805* (2013.01); *H04L 45/50* (2013.01)

(58) Field of Classification Search
None
See application file for complete search history.

(56) References Cited

U.S. PATENT DOCUMENTS

| | | | | |
|---|---|---|---|---|
| 7,130,304 B1* | 10/2006 | Aggarwal | ............... | H04L 45/50 370/392 |
| 7,804,767 B1* | 9/2010 | Owens | ................... | H04L 45/00 370/242 |
| 2005/0152286 A1* | 7/2005 | Betts | ..................... | H04L 45/021 370/255 |
| 2011/0047291 A1* | 2/2011 | Ishii | ...................... | H04L 47/122 709/238 |
| 2014/0071834 A1* | 3/2014 | Sun | ........................ | H04L 45/507 370/242 |
| 2018/0034727 A1* | 2/2018 | Nainar | .................... | H04L 45/74 |
| 2019/0089578 A1* | 3/2019 | Dadey | ................. | H04L 41/0659 |
| 2022/0124025 A1* | 4/2022 | Li | ........................... | H04L 45/28 |

FOREIGN PATENT DOCUMENTS

WO WO-2019173406 A1 * 9/2019 ......... H04L 41/0654

* cited by examiner

*Primary Examiner* — Jay L Vogel
(74) *Attorney, Agent, or Firm* — Park, Vaughan, Fleming & Dowler LLP (57) ABSTRACT

A switch that can report unavailability in a label-switched network is provided. During operation, the switch can determine that a label-switched path is unavailable for forwarding a packet. The switch can then generate a notification message for collecting unavailability information at a respective upstream hop of the label-switched path. The notification message includes a depth indicator indicating the depth of collected unavailability information and an ingress label of the packet at the switch. If the switch is an intermediate switch on the label-switched path, the switch can forward the notification message to an upstream switch on the label-switched path, thereby allowing the upstream switch to collect further unavailability information in the notification message.

16 Claims, 9 Drawing Sheets

METHOD AND SYSTEM FOR REPORTING UNAVAILABILITY IN A LABEL-SWITCHED PATH

BACKGROUND

Field

The present disclosure relates to communication networks. More specifically, the present disclosure relates to a method and system for efficiently reporting the unavailability in a label-switched path.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

The Internet is the delivery medium for a variety of applications running on physical and virtual devices. Such applications have brought with them an increasing demand for networks distributed across multiple devices. As a result, equipment vendors race to build switches capable of facilitating distributed networks. For example, a virtual private network (VPN), such as a virtual private local area network (LAN) service (VPLS) or a layer-3 VPN (L3VPN), can provide a virtualized network in a customer network distributed across multiple remote sites. A VPN allows geographically distributed sites to share a layer-2 and/or layer-3 domain. As a result, different sites of a customer network may forward traffic within the layer-2 and/or layer-3 domain. A VPN can be deployed using a label-switching protocol, such as a multiprotocol label switching (MPLS) protocol.

A label-switching protocol can facilitate a routing technique in a network that directs packets from one switch to the next based on short path-labels instead of network addresses, such as Internet Protocol (IP) addresses. In this way, the label-switching protocol may facilitate efficient traffic forwarding by avoiding complex lookups in a routing table. If a switch cannot forward a packet due to unavailability (e.g., a link or node failure), the switch can use Internet Control Message Protocol (ICMP) to send the unavailability information to other switches. ICMP can also be used for operational information sharing, such as unavailability of a service or unreachability of a host or switch. However, since a switch in a label-switched path may rely on labels to forward packets, the switch may not be aware of the packet's customer network. As a result, the switch may not use ICMP to notify the customer network regarding the unavailability.

One embodiment of the present invention provides a switch that can report unavailability in a label-switched network. During operation, the switch can determine that a label-switched path is unavailable for forwarding a packet. The switch can then generate a notification message for collecting unavailability information at a respective upstream hop of the label-switched path. The notification message includes a depth indicator indicating the depth of collected unavailability information and an ingress label of the packet at the switch. If the switch is an intermediate switch on the label-switched path, the switch can forward the notification message to an upstream switch on the label-switched path, thereby allowing the upstream switch to collect further unavailability information in the notification message.

In a variation on this embodiment, the switch can release a local label for the packet if the label-switched path is unavailable for forwarding the packet.

In a further variation, to release the local label, the switch can initiate a timer upon determining the unavailability and release the local label if the switch detects a release condition based on the timer.

In a variation on this embodiment, the switch can determine the unavailability of the label-switched path by receiving a second notification message from a downstream switch on the label-switched path. The switch can then obtain unavailability information, which can include a second ingress label of the packet at the downstream switch, from the second notification message.

In a further variation, to generate the notification message, the switch can incorporate local unavailability information, which can include the ingress label of the packet at the switch, with the obtained unavailability information to generate the collected unavailability information. Subsequently, to generate the notification message, the system can increment a second depth indicator of the second notification message to generate the depth indicator, and including the collected unavailability information and the depth indicator into the notification message.

In a variation on this embodiment, the notification message can also include a label-switching header of the packet and an inner header of an inner packet encapsulated in the packet. The packet can be forwarded on the label-switched path based on the label-switching header.

In a further variation, if the switch is an edge switch on the label-switched path, the switch can identify a source address of the inner header in the notification message. The switch can then send an error message indicating the unavailability to the identifier source address.

In a further variation, if the switch is an edge switch on the label-switched path, the switch can identify a service identifier of the label-switching header in the notification message. The service identifier can be associated with a service provided by the label-switched path. The switch can then identify a service database based on the service identifier.

In a variation on this embodiment, if the switch is an edge switch on the label-switched path, the switch can generate an alert for a management system that configures the label-switched network. The alert can include the collected unavailability information in the notification message.

In a variation on this embodiment, the switch can determine a forwarding class for the packet. The forwarding class can indicate a class of packets that can be forwarded to a same edge switch. The switch can include information of the forwarding class into the notification message.

The embodiments described herein solve the problem of reporting unavailability in a label-switched path to the edge switch of the path by forwarding a notification message that can collect (or accumulate) unavailability information at each upstream hop of the path to the edge switch. At each hop of the path, a switch can obtain (or generate) the message, incorporate local path information into the message, and forward the updated message to an upstream switch. In this way, when the message reaches the edge switch of the path, the edge switch can determine the unavailability information for the entire path and execute remedial actions. Furthermore, the edge switch can send an error message to the customer network based on the collected (or accumulated) unavailability information.

With existing technologies, if a switch determines that a packet is not deliverable due to an issue (e.g., unavailability of a link and/or node), the switch may generate an error message. Typically for an IP network, the error message can include an ICMP packet. The error message can include unavailability information (e.g., the reason and type of the issue), and the IP header, and 64 bits from the original packet. The error message can be used by the switch to notify other switches and management systems regarding the issue. A network operator may obtain the information associated with the issue from a management system. The switch can obtain the source address of the original undelivered packet and set the obtained address as the destination address of the error message. In this way, the switch can notify the source device regarding the issue.

However, if the switch operates based on a label-switching protocol, such as MPLS, the packet can be a label-switched packet comprising the original IP packet encapsulated with a label-switching header. The label-switching header can include a label (e.g., an MPLS transport label). If the packet belongs to a service provided over the label-switched network between customer sites, the label-switching header can also include a service identifier that identifies a service entity associated with the service. For example, if the packet belongs to a VPN between customer sites, the label-switching header can also include a VPN identifier (e.g., an MPLS VPN label). In this way, the label-switching header can be double-tagged with one transport label switched at a respective hop and a VPN identifier that may remain persistent between the edge switches. Since the switch can forward the packet over a label-switched path by switching the label in the label-switching header, the switch may not examine the inner IP header of the original packet to determine the source of the packet.

Furthermore, if the switch is an intermediate switch in the path, the switch may also be an intermediate switch in the provider network coupling the customer sites. Because the switch does not process the inner IP packets, the switch may not participate in the customer network. As a result, the switch may not maintain information associated with a customer virtual routing and forwarding (VRF) or be aware of a VPN label. Consequently, the switch may not have sufficient information about the inner IP header of the original packet even if the switch inspects the inner IP header. Therefore, the switch may not be able to determine the source of the packet. Under such circumstances, the switch can drop the packet without notifying the source of the original IP packet. To mitigate this issue, the provider network may deploy a mesh of detection mechanism (e.g., MPLS Bidirectional Forwarding Detection (BFD)) between the edge switch pairs. However, such a deployment is cumbersome and specific to the two switches.

To solve this problem, upon determining that the packet cannot be forwarded via the label-switched path, the switch can generate a notification message comprising the unavailability information associated with the switch and the path. The notification message can also include header information of the original packet. The switch can then send the message to the upstream switch of the path. The upstream switch can receive the message and retrieve the unavailability information. Based on the retrieved unavailability information, the upstream switch can identify the path and determine that the packet cannot be forwarded via the path. The upstream switch can then add the unavailability information associated with the upstream switch to the retrieved unavailability information.

The upstream switch can then regenerate the notification message comprising the updated unavailability information and send the regenerated notification message upstream via the path. In this way, the notification message can collect (or accumulate) unavailability information at a respective upstream hop. When the edge switch of the path (i.e., the switch coupled to the customer network) receives the notification message, the edge switch becomes aware of the information at each hop and can perform a corrective action. For example, the edge switch can determine whether the packet can be forwarded via another path that can avoid the unavailability. If the path is based on MPLS, the edge switch can be a provider edge (PE) switch, which can be coupled to the customer network via a gateway switch, such as a customer edge (CE) switch.

Since the edge switch facilitates the VPN between the customer network sites across the provider network, the edge switch may participate in and maintain the customer VRF. Therefore, the edge switch can be aware of the source IP address of the original packet. Based on header information of the original packet in the notification message, the edge switch can send an error message (e.g., an ICMP error message for an IP-level error) to the source IP address of the packet via the gateway switch. In addition, the edge switch can generate an alert detailing the unavailability information and provide the alert to a management system that configures and/or manages the provider network. Based on the alert, an administrator of the provider network can perform a recovery action (e.g., repair a link and/or node failure). Instead of probing a respective switch in the provider network using a tool, such as traceroute or ping, the administrator can readily obtain the unavailability information.

In some embodiments, the notification message can be an ICMP error message, which can be a unicast message destined to an upstream switch in the path. The unavailability information can include a forwarding class of the original packet, the depth of the unavailability information, an ingress (or incoming) label of the packet, and an identifier of the switch. If the label-switched path is based on MPLS, the forwarding class can be a forwarding equivalence class (FEC), which indicates a class of packets that may be forwarded in the same way. The depth can indicate how many switches have contributed to the unavailability information. The depth can be represented by a counter that can be incremented by a respective switch for which the notification message has collected the unavailability information. The ingress label of the packet can be the label allocated to the upstream switch. The identifier of the switch can be an IP address and/or a media access control (MAC) address of the switch.

If a switch has multiple upstream switches, the switch may forward the notification message to a respective upstream switch. However, if only one upstream switch participates in the path, the switch can determine which upstream switch has sent the packet and send the notification message to that switch. The switch may determine the upstream switch based on the ingress port of the packet and/or a label indicated by its downstream switch in the notification message. The switch may look up the label in the label information base (LIB) and determine the corresponding ingress label and identify the upstream switch. In this way, instead of sending to all upstream switches, the switch may send the notification message only to the switch from which it has received data for the path.

When a path becomes unavailable, packets sent through the path can no longer reach the destination. However, if an upstream switch cannot process or recognize the notification message due to incompatibility, the unavailability information may not propagate to the edge switch. Reasons for incompatibility can include, but are not limited to, different software/operating system versions, firmware versions, and vendors. As a result, a switch may continue to receive packets for the path from an upstream switch even when the switch has sent the notification message to the upstream switch.

To address this issue, in addition to sending the notification message, the switch may also release (or withdraw) the label associated with the path. For example, if the path is based on MPLS, the switch can use MPLS label withdrawal process to release the label. This label can be the would-be egress label for the packet at the switch. By releasing the label, the switch can notify the upstream switch that the ingress label, which is allocated to the packet by the upstream switch, can no longer be used, and labels should be reallocated. As a result, the upstream switch can recognize that the local label for the packet is no longer usable, and the current path is terminated.

In some embodiments, in parallel to sending the notification message, the switch can trigger a timer for releasing the label and wait for a release condition to be triggered. If the switch continues to receive traffic and the path remains unavailable when the timer expires, the switch can detect that the release condition and release the label. By waiting for the timer to expire before releasing the label, the switch can wait for the unavailability to resolve before terminating the path. Hence, even if the switch sends the notification message, the switch can still maintain the path. Consequently, if the unavailability is resolved quickly (e.g., a link flap), the switch may not need to terminate the path; and the management system and the edge switch is still notified regarding the unavailability.

In this disclosure, the term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "PE node" is used in a generic sense and can refer to any network device participating in a label-switched network. A PE node can refer to any networking device capable of establishing and maintaining a label-switched path to another PE node. A PE node may also refer to a networking device capable of coupling a provider network and a customer network while participating in path/forwarding detection in both networks.

The term "message" refers to a group of bits that can be transported together across a network. "Message" should not be interpreted as limiting embodiments of the present invention to layer-3 networks. "Message" can be replaced by other terminologies referring to a group of bits, such as "packet," "frame," "cell," "datagram," or "transaction."

Network Architecture

Figure 1A:
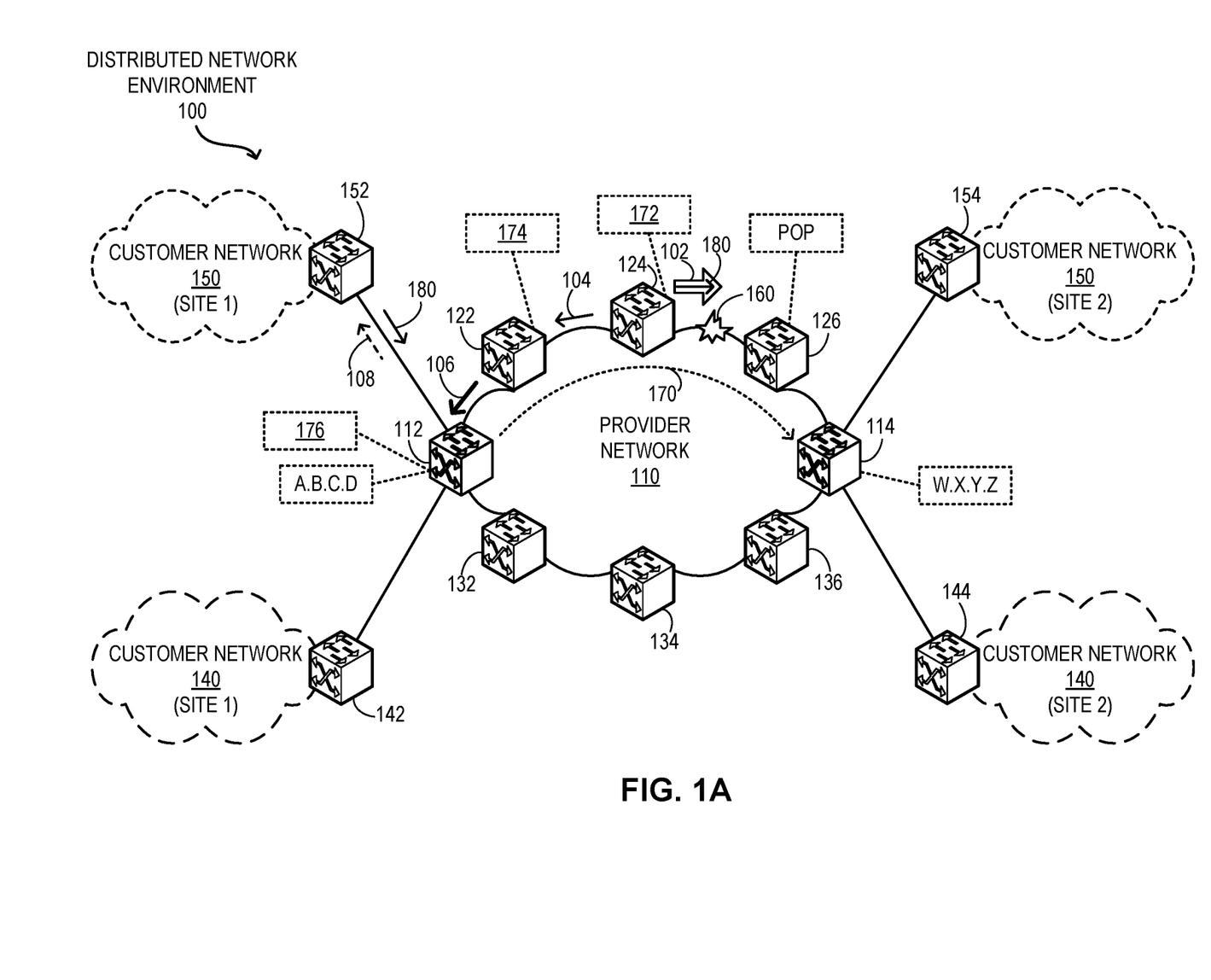
FIG. 1A illustrates an exemplary reporting of unavailability in a label-switched path in a distributed network environment, in accordance with an embodiment of the present application.

FIG. 1A illustrates an exemplary reporting of unavailability in a label-switched path in a distributed network environment, in accordance with an embodiment of the present application. As illustrated in FIG. 1, a distributed network environment 100 can include customer networks 140 and 150 belonging to two different entities (e.g., two different institutions). Each of customer networks 140 and 150 can be distributed across a plurality of sites. The sites of customer networks 140 and 150 can be coupled to each other via a provider network 110. Provider network 110 can include a number of switches 112, 114, 122, 124, 126, 132, 134, and 136. Switches 112 and 114 can be edge switches for network 110. For example, edge switch 112 can couple network 110 to site 1 of customer networks 140 and 150 via customer gateways 142 and 152, respectively. Similarly, edge switch 114 can couple network 110 to site 2 of customer networks 140 and 150 via customer gateways 144 and 154, respectively.

In some embodiments, network 110 can be a label-switched network. Examples of a label-switched network can include, but are not limited to, Frame Relay, Asynchronous Transfer Mode ATM, and MPLS. If network 110 is based on MPLS, switches 112 and 114 can be PE switches, and the rest of the switches of network 110 may be provider switches. A respective customer gateway can then be a CE switch. A respective customer network can be an Ethernet and/or IP network, and a respective switch of a customer network can be an Ethernet switch and/or IP router. Under such a scenario, communication among the switches in a customer network can be based on Ethernet and/or IP. A customer network can also be a Gen-Z network, and a respective switch of the customer network can then be a Gen-Z component. A Gen-Z network can be a memory-semantic fabric that can be used to communicate to the devices in a computing environment.

Customer network 150 facilitates a virtualized network distributed across sites 1 and 2 of customer network 150 using a VPN over network 110 (e.g., based on VPLS or L3VPN). The VPN can allow geographically distributed sites 1 and 2 of network 150 to share a layer-2 and/or layer-3 domain. As a result, sites 1 and 2 of customer network 150 may forward traffic within the layer-2 and/or layer-3 domain via network 110. A routing protocol, such as an open shortest path first (OSPF) protocol, can be deployed in network 110 to establish routers or paths using the addresses (e.g., IP and/or MAC addresses) of the switches in network 110. Suppose that the IP addresses of edge switches 112 and 114 are A.B.C.D and W.X.Y.Z, respectively. The routing protocol can then determine routes for both addresses A.B.C.D and W.X.Y.Z. Here, A.B.C.D and W.X.Y.Z can represent respective FECs.

Network 110 can also deploy a label allocation protocol for allocating labels. Examples of the label allocation protocol can include, but are not limited to, Label Distribution Protocol (LDP), Resource Reservation Protocol (RSVP), and a variation thereof. To transfer packets between sites 1 and 2 of customer network 150, the routing protocol can then establish reachability through one or more paths, such as path 170, between switches 112 and 114 using their respective IP addresses. Using the label allocation protocol, a downstream switch can allocate a label and provide the label to the upstream switch. This process can be repeated for a respective route prefix. For an FEC indicated by prefix W.X.Y.Z/32, switch 114 can allocate a pop label (e.g., an implicit NULL label) to upstream switches 126 and 136. The pop label can indicate that any label-switched packet for FEC W.X.Y.Z/32 should be popped at switch 126 or 136 without any further switching of labels.

Subsequently, on path 170, switch 126 can allocate a label 172 to switch 124. As a result, when a packet for FEC W.X.Y.Z/32 is received at switch 124, the egress (or outgoing) label can be 172. Similarly, switch 124 can allocate a label 174 to switch 122, and switch 122 can allocate a label 176 to switch 112. In the same way, upon the allocation of the pop label to switch 136, switches 136, 134, and 132 can allocate a label to their respective upstream switch for FEC W.X.Y.Z/32. In this way, there can be two paths (e.g., path 170) from switch 112 for FEC W.X.Y.Z/32 (i.e., to edge switch 114). The VPN service coupling sites 1 and 2 of customer network 150 can be deployed using these paths between switches 112 and 114.

To facilitate the VPN service, sites 1 and 2 of customer network 150 can import each other's location information by exchanging routing information (e.g., the customer VRFs). The exchange of routing information can be performed using a border gateway protocol (BGP) during the configuration of the VPN. When the routing information is exchanged between the sites, a VPN identifier identifying the VPN can be exchanged as well. The VPN label may allow a remote edge switch to deliver the packet to the proper customer location.

These two label-switched paths can be considered as logical tunnels. For FEC W.X.Y.Z/32, switch 112 can encapsulate a packet received from switch 152 with a label-switching header (e.g., an MPLS header). Regardless of whichever path is used, the packet can be forwarded based on the label-switching header without inspecting the inner IP header of the original packet. To forward the packet on path 170, switch 112 can insert label 176 to the label-switching header of the packet as an egress (or outgoing) transport label and forward the packet to the next-hop switch 122.

Here, switch 112 can use path 170 established by the routing protocol to determine the next-hop switch. If the packet belongs to a service provided over network 110, the label-switching header can also include a service identifier that identifies a service entity (e.g., a service database) associated with the service. For example, if the packet belongs to a VPN service, the label-switching header of the packet can also include an inner header comprising the VPN identifier (e.g., an MPLS VPN label that remains persistent in the header). The service database can then be the VRF associated with the VPN identifier. Upon receiving the packet, switch 122 can consider label 176 as the ingress label, swap (or switch) label 176 with label 174 as the egress label, and forward the packet to the next-hop switch 124.

Switch 124 can swap label 174 with label 172 as the egress label and forward the packet to the next-hop switch 126. Upon receiving the packet, switch 126 can pop label 172, thereby removing the label-switching header, and forward the packet to switch 114. Here, the VPN identifier in the inner header can remain persistent and may not be swapped. As a result, switch 114 can receive the packet with the inner header comprising the VPN identifier. Switch 114 can then determine to which VPN the packet belongs and identify the corresponding switch 154 as the next-hop switch since the packet is from customer network 150. Subsequently, switch 114 can forward the packet to switch 154 based on the customer VRF associated with the VPN identifier.

Suppose that an IP packet 180 from site 1 of customer network 150 is being forwarded via path 170 of network 110. Upon receiving the packet, switch 112 can encapsulate the packet with a label-switching header to generate packet 102. Hence, packet 102 can be a label-switched packet comprising IP packet 180 encapsulated with a label-switching header. Due to an issue 160 (e.g., a link between switches 124 and 126, and/or switch 126 is unavailable), switch 124 can determine that packet 102 is not deliverable to next-hop switch 126. Since switch 124 may forward packet 102 over path 170 by switching the label in the label-switching header, switch 124 may not examine the inner IP header in packet 102 (i.e., the IP header of packet 180) to determine the source IP address of packet 180.

Because switch 124 does not process the inner IP packets, switch 124 may not maintain information associated with the VRF of customer network 150 or be aware of the VPN label. Consequently, switch 124 may not have sufficient information about the IP header of packet 180 even if switch 124 inspects the inner IP header in packet 102. Therefore, switch 124 may not be able to determine the source address packet 180 in packet 102. Under such circumstances, switch 124 may drop packet 102 without notifying the source. To mitigate this issue, network 110 may deploy a mesh of detection mechanism (e.g., MPLS BFD) between the edge switch pair. However, such a deployment is cumbersome and specific to switches 122 and 114.

To solve this problem, upon determining that packet 102 cannot be forwarded to next-hop switch 126 of path 170, switch 124 can generate a notification message 104 comprising the unavailability information associated with switch 124 and path 170. Notification message 104 can also include header information of packet 102. The header information can include the label-switching header of packet 102 and the inner headers, such as the IP and/or Ethernet headers of packet 180. Switch 124 can then send message 104 to upstream switch 122 of path 170. Switch 122 can receive message 104 and retrieve the unavailability information. Based on the retrieved unavailability information, switch 122 can determine that packet 102 cannot be forwarded for FEC W.X.Y.Z/32. Switch 122 can then add the local unavailability information (e.g., associated with switch 122) to the retrieved unavailability information.

Switch 122 can then regenerate notification message 106 comprising the updated unavailability information and the header information of packet 102. Subsequently, switch 122 can send message 106 to upstream switch 112 in path 170. Since message 106 comprises unavailability information from switches 124 and 122, message 106 has accumulated unavailability information at a respective upstream hop (denoted with a thick line). When switch 112 receives message 106, switch 112 can become aware of the unavailability information associated with each hop and can perform a corrective action. For example, switch 112 can determine whether packet 102 can be forwarded via another path that can avoid issue 160 (e.g., via switches 132, 134, and 136). Based on the header information of packet 102 in message 106, switch 112 can determine the source address of packet 180. Switch 112 can then send an error message 108 (denoted with a dashed line), such as an ICMP error message, to the source address of packet 180 to notify the source device regarding issue 160.

If switch 122 has multiple upstream switches, switch 122 may forward message 106 to a respective upstream switch. However, if only one upstream switch, such as switch 112, participate in path 170, switch 122 can determine that switch 112 has sent packet 102 and send message 106 to switch 112. Switch 122 may determine switch 112 as the upstream switch based on the ingress port of packet 102 and/or label 174 indicated by switch 124 in message 104. Switch 122 may look up label 174 in the local LIB and determine corresponding label 172 and identify switch 112 as the upstream switch. In this way, instead of sending to all upstream switches, switch 122 may send message 106 only to switch 122 from which it has received packet 102.

When path 170 becomes unavailable, packets sent through path 170 can no longer reach switch 114. However, if a switch, such as switch 122, cannot process or recognize message 104 due to incompatibility, the unavailability information may not propagate to switch 112. The incompatibility can arise from switches 122 and 124 having different software/operating system versions, firmware versions, and vendors. As a result, switch 124 may continue to receive packets for FEC W.X.Y.Z/32 from switch 122 even when switch 124 has sent message 104 to switch 122. To address this issue, in addition to sending message 104, switch 124 may also release (or withdraw) label 172 associated with path 170. For example, if path 170 is based on MPLS, switch 124 can use MPLS label withdrawal process to release label 172.

By releasing label 172, switch 124 can notify switch 122 that label 174, which corresponds to label 172, can no longer be used and should be reallocated. As a result, switch 122 can recognize that label 174 is no longer usable for FEC W.X.Y.Z/32, and path 170 is terminated. In some embodiments, in parallel to sending message 104, switch 124 can initiate a timer for releasing label 172 and wait for a release condition to be triggered. If switch 124 continues to receive traffic and issue 160 still remains (e.g., path 170 still remains unavailable) when the timer expires, switch 124 can determine that the release condition has been triggered and hence, release label 172. By waiting for the timer to expire before releasing label 172, switch 124 can wait for issue 160 to resolve prior to terminating path 170. Hence, even if switch 124 sends message 104, switch 124 may still maintain an operational state for path 170. Consequently, if issue 160 is resolved quickly (e.g., a link flap), switch 124 may not need to terminate path 170, and switch 112 is still notified regarding issue 160.

Figure 1B:
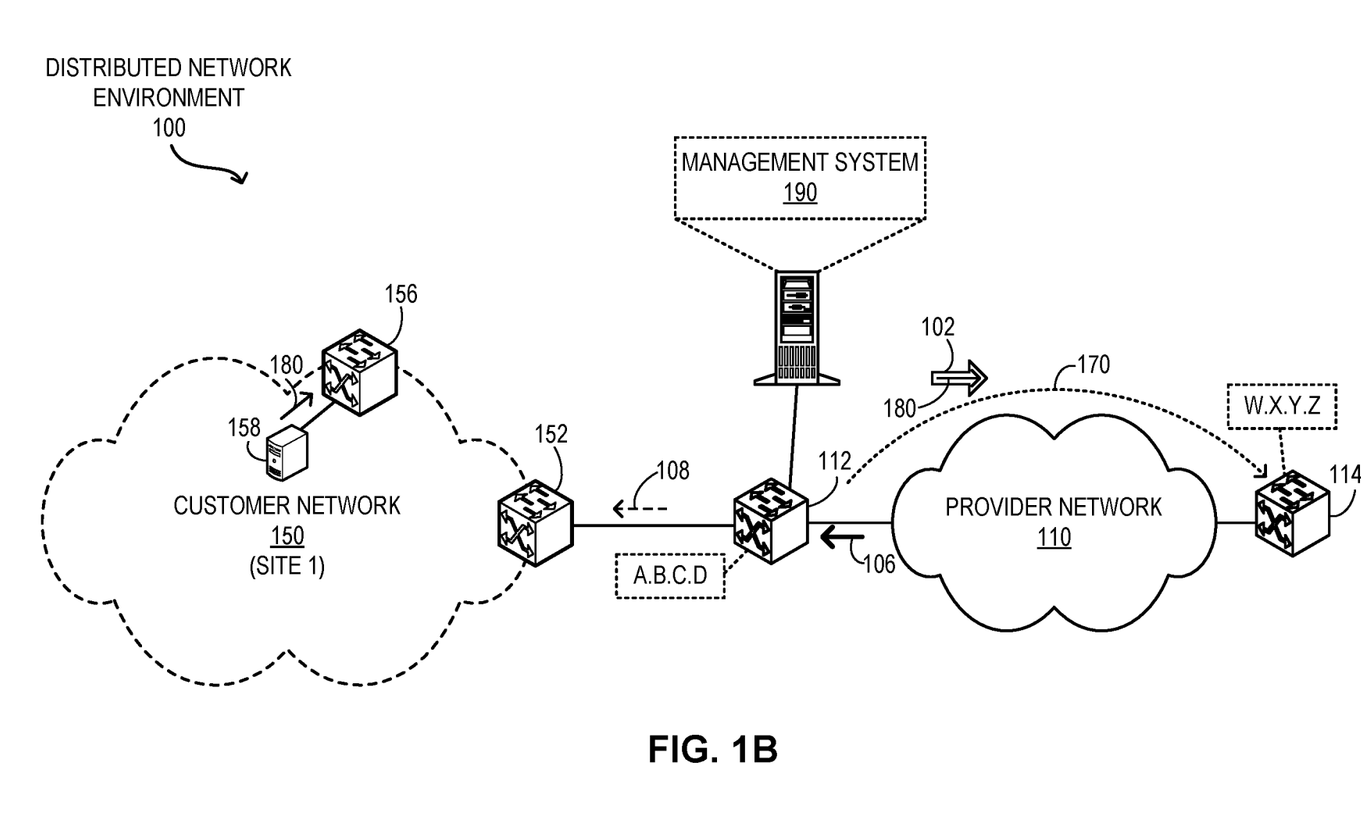
FIG. 1B illustrates an exemplary reporting of unavailability in a label-switched path to a customer network, in accordance with an embodiment of the present application.

FIG. 1B illustrates an exemplary reporting of unavailability in a label-switched path to a customer network, in accordance with an embodiment of the present application. A device 158 may send packet 180 via switch 156 of customer network 150 toward provider network 110. Since switch 112 facilitates the VPN between sites 1 and 2 of customer network 150 across network 110, switch 112 may participate in and maintain the VRF of customer network 150. Therefore, switch 112 can be aware of the location of the source IP address, which can be the IP address of device 158, of packet 180. Upon receiving message 106, switch 112 can obtain the unavailability information from message 106 and determine that path 170 is not available for forwarding packet 180.

Switch 112 can inspect the label-switching header of packet 102 in message 106 and obtain the VPN identifier (or any service identifier) from the inner-header of the label-switching header. In some embodiments, the VPN identifier can be an identifier of the VRF of customer network 150. Switch 112 can also inspect the IP header (for an L3VPN) or the Ethernet header (for a VPLS) of packet 180 in message 106. Switch 112 can then determine the source and destination addresses of the inspected header. If the inspected header is an IP header, the source and destination addresses are corresponding IP addresses. The source IP address of packet 180 can be the IP address of device 158. Based on the VPN identifier, switch 112 can also identify customer network 150 and determine the corresponding VRF. Switch 112 can then determine forwarding information for the IP address of device 158 from the VRF.

Subsequently, switch 112 can generate a message 108 indicating that path 170 is unavailable. Switch 112 can set the IP addresses of device 158 and switch 112 as the source and destination addresses of message 108. Error message 108 can be an ICMP error message reporting the issue that has prevented the forwarding of packet 180. By looking up the IP address of device 158 in the VRF of customer network 150, switch 112 can determine the forwarding information for message 108. Accordingly, switch 112 can send error message 108 to the IP address of device 158 via switch 152. Subsequently, switch 152 may forward message 108 to device 158 via switch 156. In this way, message 106 allows switch 112 to be aware of the unavailability information and notify device 158 based on message 108.

Furthermore, switch 112 can generate an alert detailing the unavailability information and provide the alert to a management system 190 that configures and/or manages network 110. The alert can be an error notification message in a format that management system 190 can process. The alert may include the unavailability information of message 106. Furthermore, the alert may include a reformatted copy of message 106 with updates source and destination IP addresses. Based on the alert, an administrator of network 110 can identify the issue at management system 190 and perform a recovery action (e.g., repair a link and/or node failure). Instead of probing a respective switch in network 110 using a tool, such as traceroute or ping, the administrator can readily obtain the unavailability information from management system 190.

Figure 2:
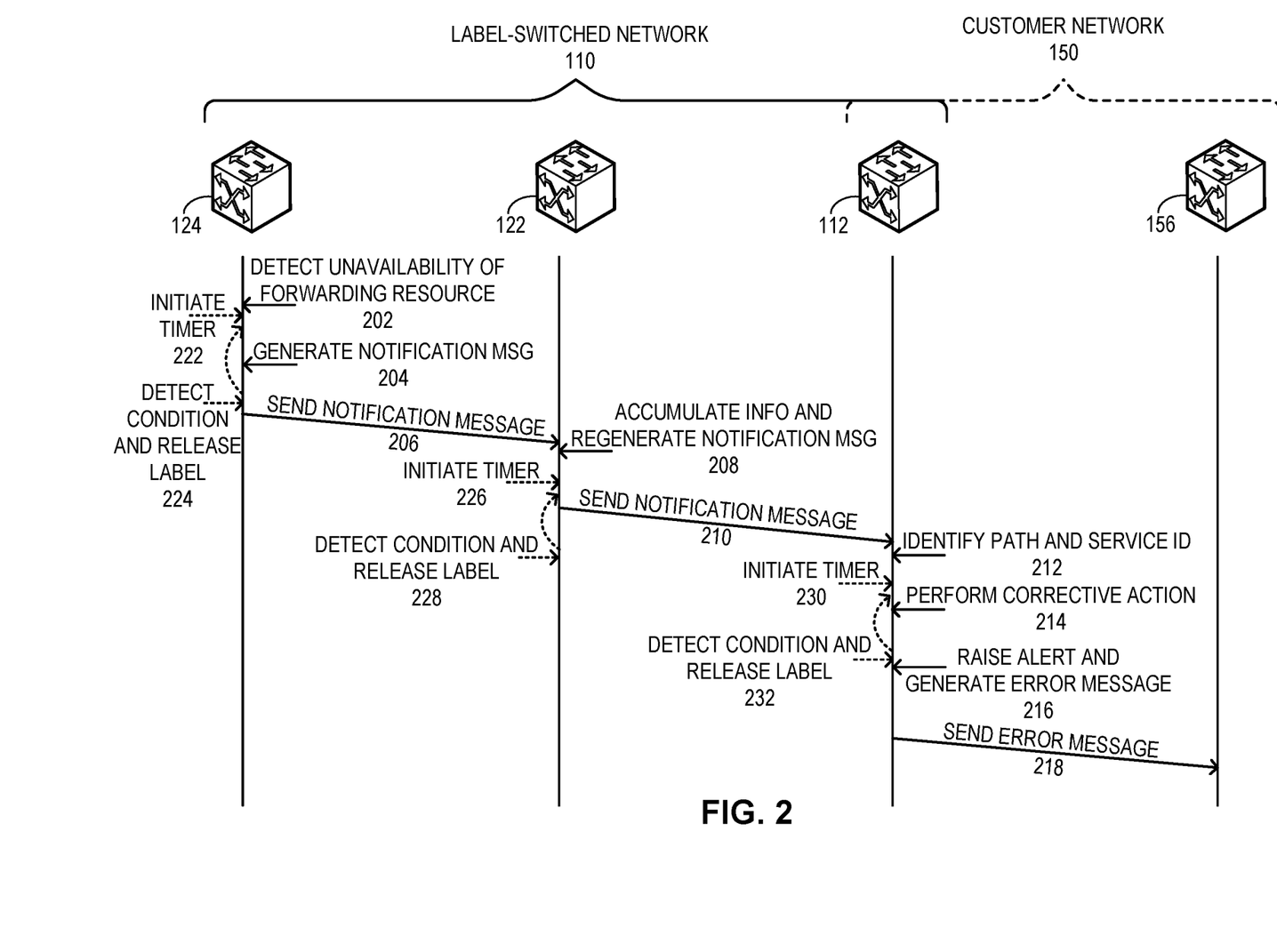
FIG. 2 illustrates an exemplary communication for reporting unavailability in a label-switched path in a distributed network environment, in accordance with an embodiment of the present application.

FIG. 2 illustrates an exemplary communication for reporting unavailability in a label-switched path in a distributed network environment, in accordance with an embodiment of the present application. During operation, switch 124 can detect the unavailability of forwarding resources (e.g., a link or a next-hop node) on a forwarding path of a packet (operation 202). Switch 124 can generate a notification message comprising unavailability information associated with the detected unavailability (operation 204). Switch 124 can then send the notification message to upstream switch 122 (operation 206). Based on the detection, switch 124 can, in parallel, initiate a timer for releasing a label for the forwarding path (operation 222).

Upon detecting a release condition, switch 124 can release the label (operation 224). The release condition can be triggered if switch 124 receives traffic before the expiration of the timer, and the unavailability is not resolved when the timer expires. Switch 122 can accumulate the local unavailability information into the unavailability information of the notification message and regenerate the notification message (operation 208). Switch 122 can then send the regenerated notification message to upstream switch 112 (operation 210). Based on the notification message and/or the release of the label at switch 124, switch 122 can, in parallel, initiate a timer for releasing a label for the forwarding path (operation 226). Upon detecting a release condition, switch 122 can release the label (operation 228).

From the received notification message, switch 112 can identify the path (e.g., the corresponding FEC) and a service identifier of a service provided on the path (e.g., a VPN identifier) (operation 212). Switch 112 can then perform a corrective action that may allow switch 112 to continue to forward packets avoiding the unavailability (operation 214). For example, if another path exists for the FEC, switch 112 may select that path for forwarding. This backup path may be predetermined or determined upon detecting the unavailability.

Switch 112 can also raise an alert for a management system and generate an error message indicating the unavailability (operation 216). Switch 112 can then send the error message to switch 156 (operation 218). Here, switch 156 can be a gateway switch via which the packet has been received. Based on the notification message and/or the release of the label at switch 122, switch 112 can, in parallel, initiate a timer for releasing a label for the forwarding path (operation 230). Upon detecting a release condition, switch 122 can release the label (operation 232).

Figure 3A:
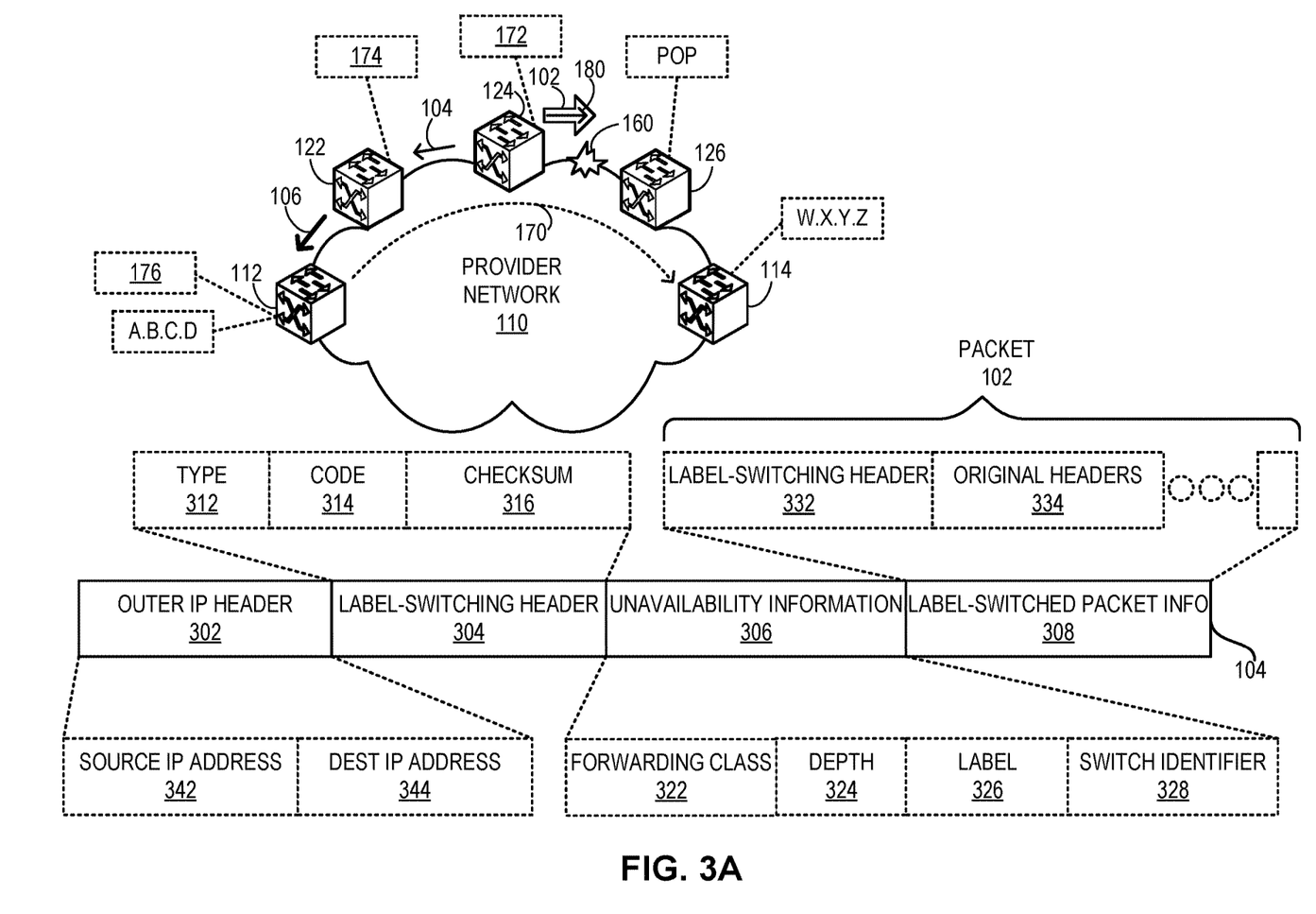
FIG. 3A illustrates an exemplary notification message with unavailability information of a label-switched path, in accordance with an embodiment of the present application.

FIG. 3A illustrates an exemplary notification message with unavailability information of a label-switched path, in accordance with an embodiment of the present application. Notification message 104 can include an outer IP header 302, a label-switching header 304, unavailability information 306, and original label-switched packet information 308. Notification message 104 can be an ICMP error message, each of which can be a unicast message from switch 124 to switch 122. Hence, source IP address 342 and destination IP address 344 of outer IP header 302 can be the IP addresses of switches 124 and 122, respectively. Label-switching header 304 can then be an ICMP header and can include a type 312, a code 314, and a checksum 316. The value for type 312 can indicate that the label-switched path (e.g., path 170) is unreachable. The value for code 314 can indicate that there is no label-switched path for the label (e.g., label 172). Checksum 316 can be the checksum for packet 104. The fields in label-switching header 304 can be the first four bytes of an ICMP message.

Unavailability information 306 can include a forwarding class 322 of path 170, depth 324 of unavailability information 306, ingress label 326 of packet 102 at switch 124, and an identifier 328 of switch 124. If the label-switched path is based in MPLS, forwarding class 322 can be an FEC corresponding to switch 114. In this example, the FEC can be W.X.Y.Z/32, which indicates a class of packets that may be forwarded to switch 114. As a result, if another path to switch 114 exists, packets associated with FEC W.X.Y.Z/32 can be forwarded via that path. Depth 324 can indicate how many switches have contributed to unavailability information 306. Since message 104 is generated by switch 124, depth 324 can have a value of 1. Depth 324 can be represented by an indicator, such as a counter represented by a positive integer, that can be incremented by a respective switch for which message 104 has collected unavailability information.

Since packet 102 has been received from switch 122, ingress label 326 of packet 102 can be label 174, which is allocated to upstream switch 122. In other words, label 326 can be the label that switch 124 could not forward. Identifier 328 of switch 124 can be an IP address and/or a MAC address of switch 124. Unavailability information 306 can be followed by label-switched packet information 308, which can include header information (e.g., header fields) from the original label-switched packet 102 that could not be forwarded. Label-switched packet information 308 can include the label-switching header 332 of packet 102 (e.g., a double-tagged MPLS header) and original headers 334 (e.g., the Ethernet and/or IP headers) of packet 180, if available. Label-switching header 332 can be followed by the IP header of packet 180 for an L3VPN and the Ethernet header of packet 180 for VPLS.

Figure 3B:
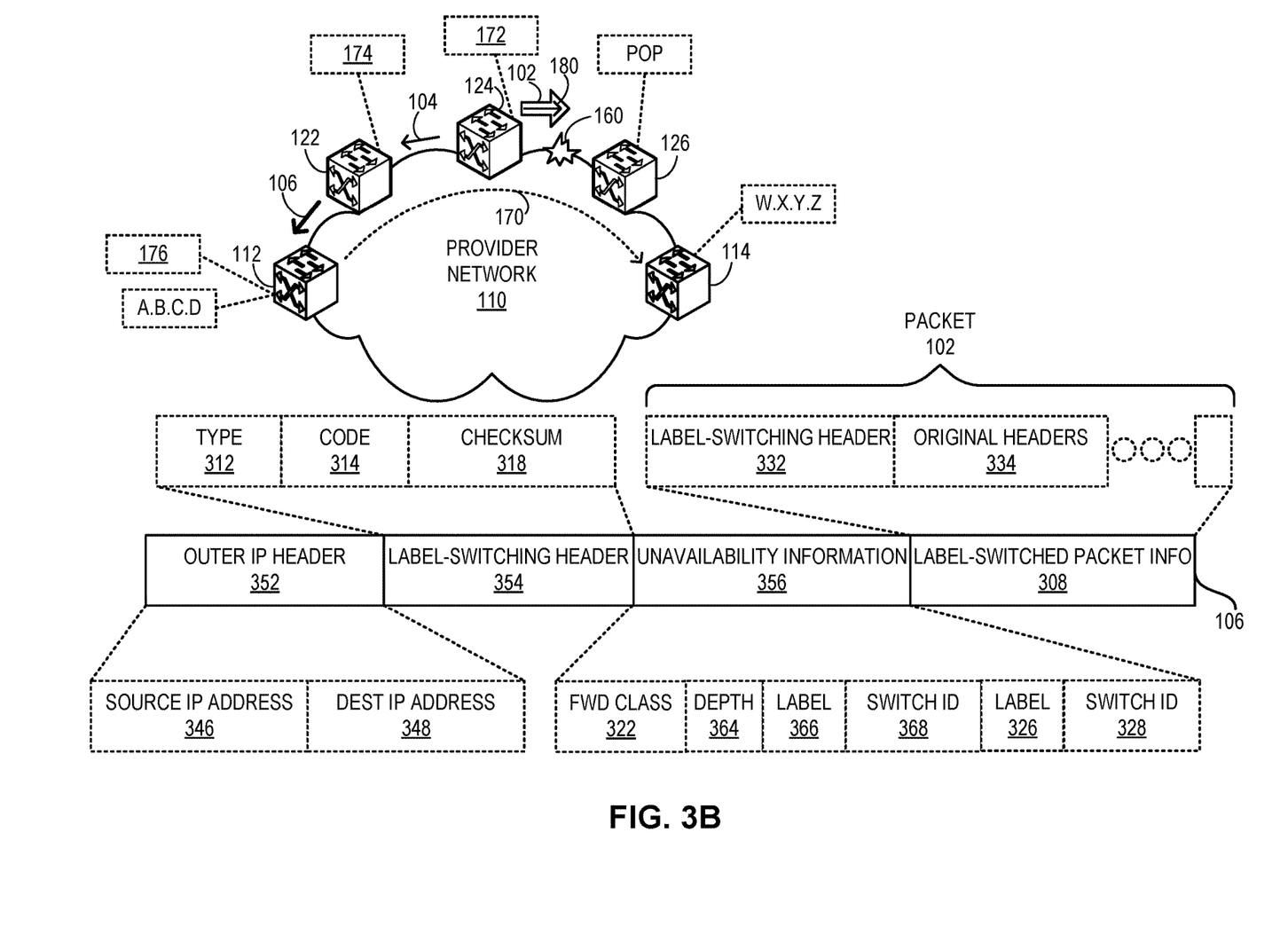
FIG. 3B illustrates an exemplary notification message with accumulated unavailability information of a label-switched path, in accordance with an embodiment of the present application.

When message 104 reaches switch 122, message 104 can collect the unavailability information of switch 122. Switch 122 generates message 106 based on the accumulation of the unavailability information. FIG. 3B illustrates an exemplary notification message with accumulated unavailability information of a label-switched path, in accordance with an embodiment of the present application. Notification message 104 can include an outer IP header 352, a label-switching header 354, unavailability information 356, and original label-switched packet information 308. Since message 106 is sent from switch 122 to switch 112, source IP address 346 and destination IP address 348 of outer IP header 352 can be the IP addresses of switches 122 and 112, respectively. Label-switching header 354 can include type 312, code 314, and a checksum 318. Here, type 312 and code 314 can remain unchanged from message 104. Checksum 318 can be the checksum for packet 106. The fields in label-switching header 354 can be the first four bytes of an ICMP message.

Unavailability information 356 can include forwarding class 322 of path 170 (e.g., FEC W.X.Y.Z/32) since forwarding class 322 remains unchanged on path 170. Unavailability information 356 can also include depth 364 of unavailability information 356 and accumulate an ingress label 366 of packet 102 at switch 122 and an identifier 368 of switch 122. Unavailability information 356 can retain label 326 and identifier 328 of switch 124 from message 104. Since unavailability information 356 can include information collected at switches 122 and 124, depth 364 can have a value of 2. Since switch 122 receives packet 102 from switch 112, ingress label 366 of packet 102 at switch 122 can be label 172. Identifier 368 of switch 122 can be an IP address and/or a MAC address of switch 122. Unavailability information 356 can be followed by label-switched packet information 308, which may remain unchanged from message 104. In this way, unavailability information 356 can accumulate information associated with switch 122 into unavailability information 306 of message 104.

Operations

Figure 4A:
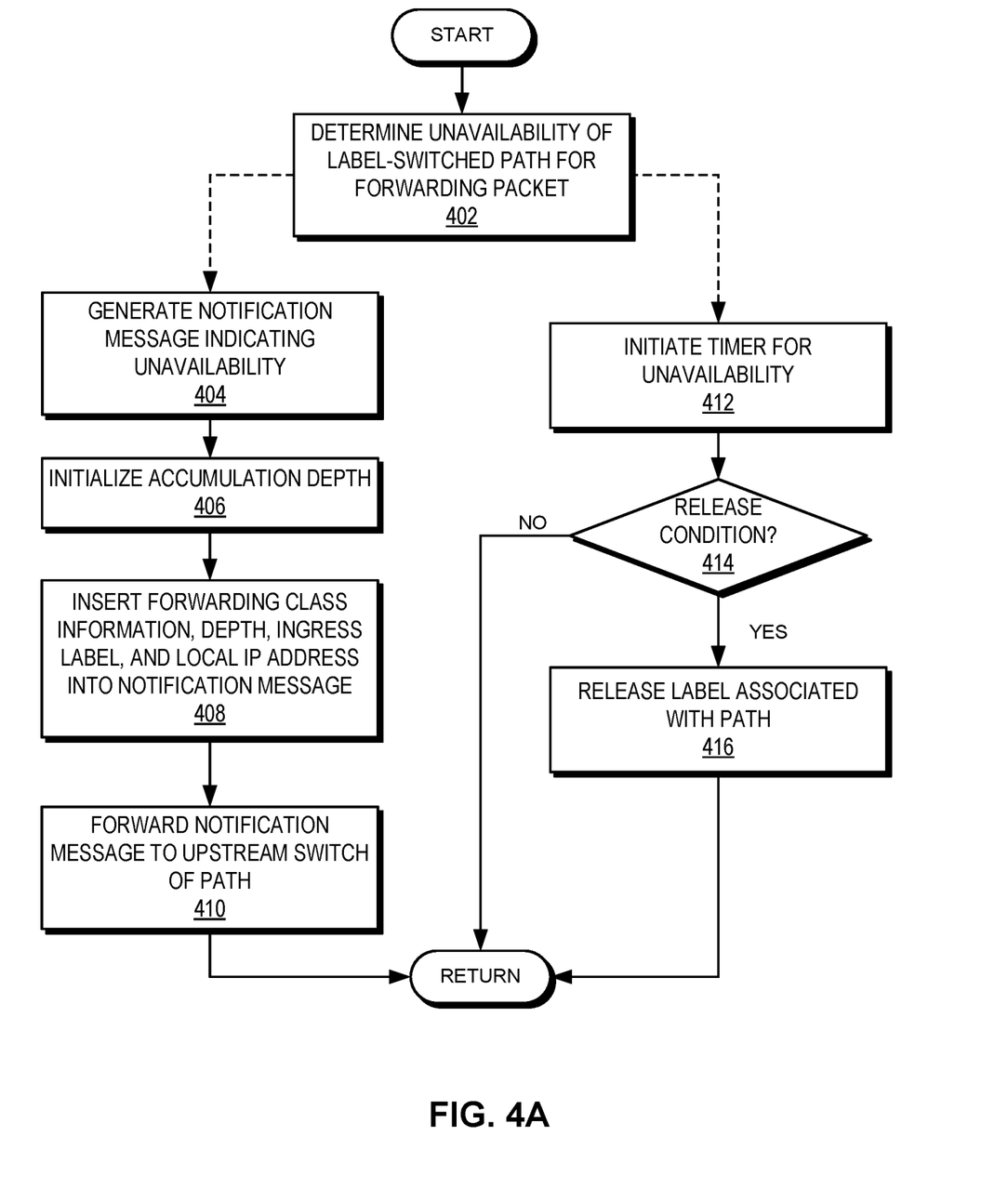
FIG. 4A presents a flowchart illustrating the process of a switch incorporating unavailability information of a label-switched path into a notification message, in accordance with an embodiment of the present application.

FIG. 4A presents a flowchart illustrating the process of a switch incorporating unavailability information of a label-switched path into a notification message, in accordance with an embodiment of the present application. During operation, the switch can determine the unavailability of a label-switched path for forwarding a packet (operation 402). For example, the switch may determine that the forwarding resources (e.g., a next-hop switch) for an ingress label of the packet are not available. The switch can then generate a notification message indicating the unavailability (operation 404) and initialize an accumulation depth for the message (operation 406). The switch can then insert the forwarding class information, depth, ingress label, and local IP address into the notification message (operation 408). The switch can forward the notification message to an upstream switch of the path (operation 410).

Upon determining the unavailability (operation 402), the switch can, in parallel, initiate a timer for the unavailability (operation 412) (denoted with dashed arrows). The switch can then determine whether a release condition has been triggered (operation 414). The release condition can be triggered if the switch receives traffic before the expiration of the timer, and the unavailability is not resolved when the timer expires. If packets continue to arrive even after sending the notification message, the switch may determine that an upstream switch is incapable of processing the notification message. As a result, when the timer expires and the unavailability is not resolved, the switch may determine that the unavailability is due to a long-term issue and the path is no longer available. Hence, if the release condition has been triggered, the switch can release the label associated with the path (operation 416).

Figure 4B:
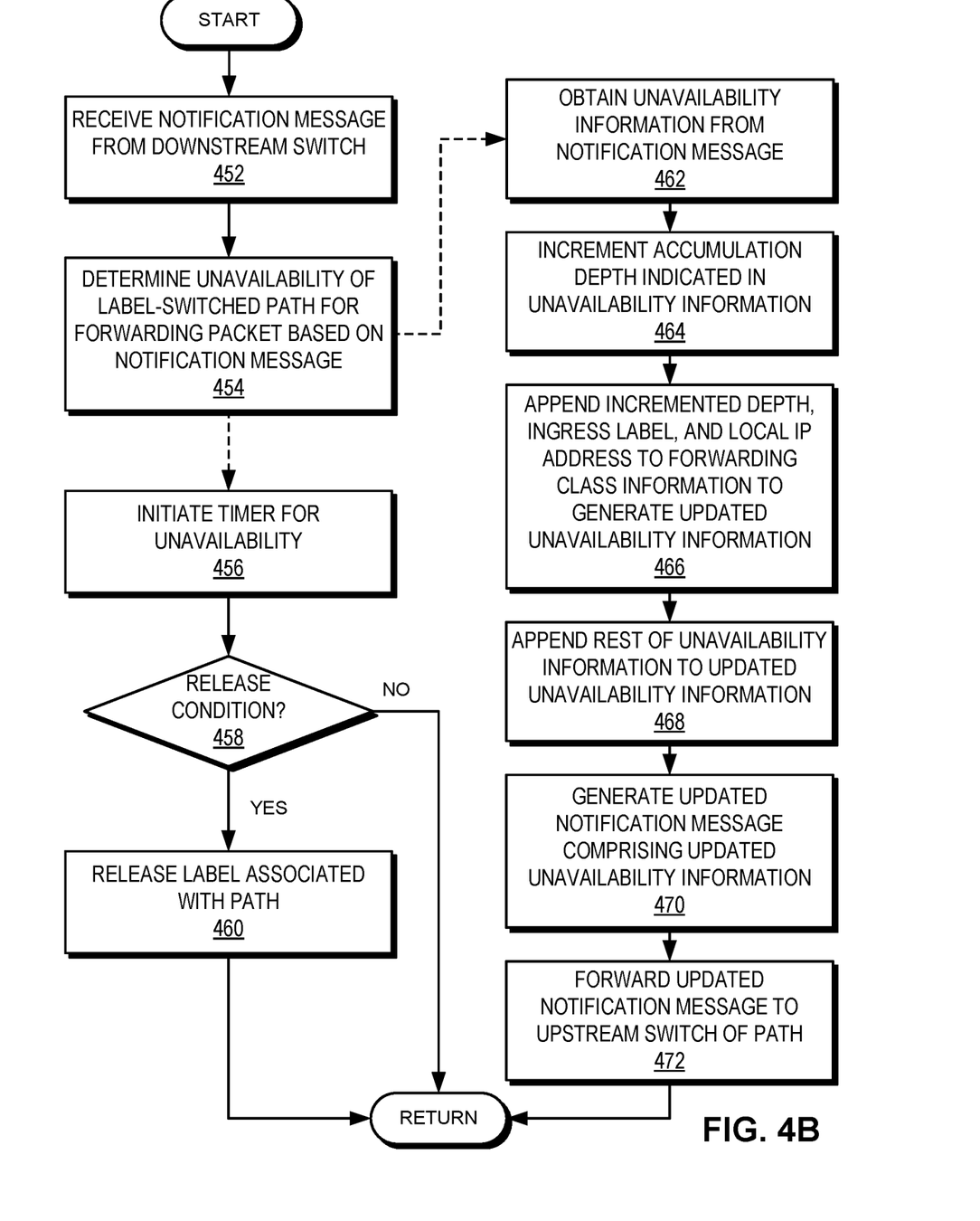
FIG. 4B presents a flowchart illustrating the process of a switch accumulating unavailability information of a label-switched path into a notification message, in accordance with an embodiment of the present application.

FIG. 4B presents a flowchart illustrating the process of a switch accumulating unavailability information of a label-switched path into a notification message, in accordance with an embodiment of the present application. During operation, the switch can receive a notification message from a downstream switch (operation 452) and determine the unavailability of a label-switched path for forwarding a packet based on the notification message (operation 454). The switch can then obtain the unavailability information from the notification message (operation 462) and increment the accumulation depth indicated in the unavailability information (operation 464). Subsequently, the switch can append the decremented depth, ingress label, and local IP address into the forwarding class information of the received notification message to generate the updated unavailability information (operation 466).

The switch can then append the rest of the unavailability information to the updated unavailability information (operation 468). Subsequently, the switch can generate an updated notification message comprising the updated unavailability information (operation 470). The switch can then forward the updated notification message to the upstream switch of the path (operation 472). Upon determining the unavailability (operation 454), the switch can, in parallel, initiate a timer for the unavailability (operation 456) (denoted with dashed arrows). The switch can then determine whether a release condition has been triggered (operation 458). If the release condition has been triggered, the switch can release the label associated with the path (operation 460).

Figure 5:
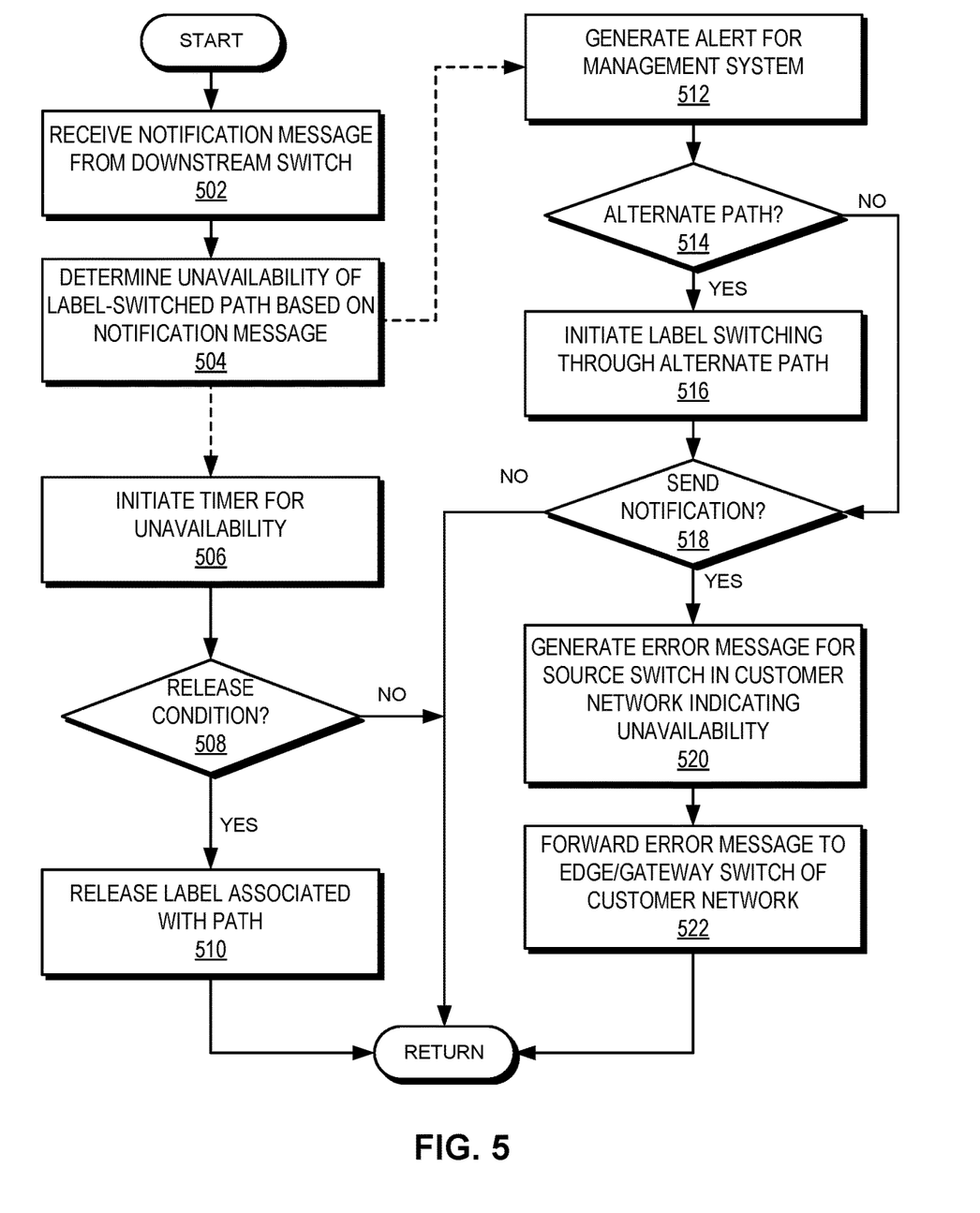
FIG. 5 presents a flowchart illustrating the process of a switch providing unavailability information of a label-switched path to a customer network, in accordance with an embodiment of the present application.

FIG. 5 presents a flowchart illustrating the process of a switch providing unavailability information of a label-switched path to a customer network, in accordance with an embodiment of the present application. During operation, the switch can receive a notification message from a downstream switch (operation 502) and determine the unavailability of a label-switched path for forwarding a packet based on the notification message (operation 504). The switch can generate an alert for a management system (operation 512) and determine whether an alternate path for forwarding the path exists (operation 514). If an alternate path exists, the switch can initiate label switching through the alternate path (operation 516).

If the alternate path does not exist (operation 514) or the label switching has been initiated (operation 516), the switch can determine whether to send a notification to the customer network (operation 518). In some embodiments, the switch can maintain a customer notification policy indicating whether to send the notification if an alternate path exists or recovery is detected within a predetermined time. For example, if an alternate path exists, packet forwarding from the customer network may not be impacted. Therefore, the switch may not send a notification if an alternate path exists. On the other hand, the customer notification policy can also indicate that each issue should be notified to the customer network regardless of the existence of an alternate path.

Accordingly, the switch can determine whether to send the notification based on the customer notification policy. The customer notification message indicates whether to notify the source of the packet to notify regarding the unavailability. The switch can then generate an error message for the source switch in the customer network indicating the unavailability (operation 520). Subsequently, the switch can forward the error message to the edge/gateway switch of the customer network (operation 522).

Upon determining the unavailability (operation 504), the switch can, in parallel, initiate a timer for the unavailability (operation 506) (denoted with dashed arrows). The switch can then determine whether a release condition has been triggered (operation 458). If the release condition has been triggered, the switch can release the label associated with the path (operation 510). In this way, the switch can provide unavailability information of a label-switched path to the source of the packet that could not be forwarded.

Exemplary Switch System

Figure 6:
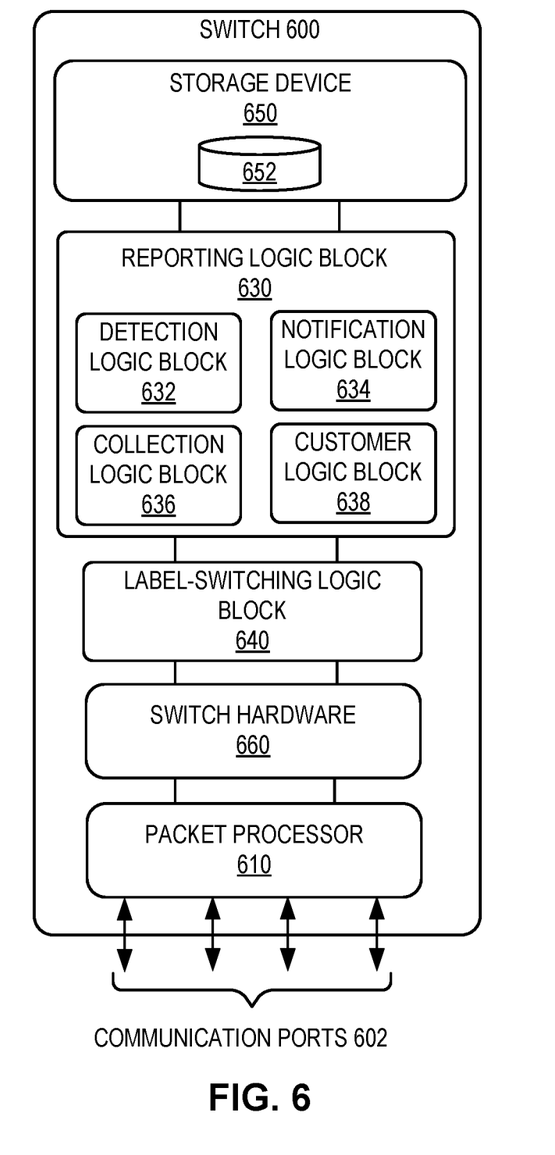
FIG. 6 illustrates an exemplary switch that supports reporting of unavailability in a label-switched path, in accordance with an embodiment of the present application.

FIG. 6 illustrates an exemplary switch that supports reporting of unavailability in a label-switched path, in accordance with an embodiment of the present application. In this example, a switch 600 includes a number of communication ports 602, a packet processor 610, a reporting logic block 630, and a storage device 650. Switch 600 can also include switch hardware 660 (e.g., processing hardware of switch 600, such as its application-specific integrated circuit (ASIC) chips), which includes information based on which switch 600 processes packets (e.g., determines output ports for packets). Packet processor 610 extracts and processes header information from the received packets. Packet processor 610 can identify a switch identifier (e.g., a media access control (MAC) address and/or an IP address) associated with switch 600 in the header of a packet.

Communication ports 602 can include inter-switch communication channels for communication with other switches and/or user devices. The communication channels can be implemented via a regular communication port and based on any open or proprietary format.

Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets.

In some embodiments, switch 600 can be a label-switching switch capable of implementing a label-switching protocol, such as MPLS. Switch 600 can then include a label-switching logic block 640 that may facilitate the control and/or data plane of the label-switching protocol in switch 600. Switch 600 may maintain a database 652 (e.g., in storage device 650). Database 652 can be a relational database and may run on one or more DBMS instances. Switch 600 can maintain an LIB associated with the label-switching protocol, a routing information base (RIB), and a forwarding information base (FIB) in the database 652.

Multicast reporting logic block 630 can include a detection logic block 632, a notification logic block 634, a collection logic block 636, and a customer logic block 638. During operation, detection logic block 632 can detect an issue, such as the unavailability of forwarding resources, with a packet. Detection logic block 632 may determine that a packet cannot be forwarded. For example, based on the ingress label of the packet, detection logic block 632 may determine that the next-hop switch is not reachable from switch 600. When the issue is detected, notification logic block 634 can generate a notification message, as described in conjunction with FIG. 3A. The notification message can be destined to an upstream switch of switch 600 on a label-switched path of the packet and include unavailability information. Packet processor 610 can then forward the notification message to the upstream switch. In some embodiments, the notification message can be an ICMP error message.

Switch 600 may receive a notification message from a downstream switch via one of communication ports 602. Collection logic block 636 can allow the notification message to collect local unavailability information. To do so, collection logic block 636 may accumulate the unavailability information into the received notification message and regenerate the notification message accordingly, as described in conjunction with FIG. 3B. Switch 600 can be an edge switch (e.g., an MPLS PE switch) that may maintain the VRF of a customer network (e.g., in the RIB). When switch 600 receives a notification message from a downstream switch, customer logic block 638 can identify the VRF (e.g., based on a service identifier) and inspect the packet information in the notification message. Accordingly, customer logic block 638 can send an error notification message to the source address of the packet via one of communication ports 602.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for reporting unavailability in a label-switched network, comprising: determining, by a switch of the label-switched network, that a label-switched path is unavailable for forwarding a packet; generating a notification message for collecting unavailability information at a respective upstream hop of the label-switched path, wherein the notification message includes: a depth indicator indicating depth of collected unavailability information and an ingress label of the packet at the switch; a label-switching header of the packet based on which the packet is forwarded on the label-switched path; and an inner header of an inner packet encapsulated in the packet; in response to the switch being an intermediate switch on the label-switched path, forwarding the notification message to an upstream switch on the label-switched path, thereby allowing the upstream switch to collect further unavailability information in the notification message; and in response to the switch being an edge switch on the label-switched path, identifying a service identifier of the label-switching header in the notification message, wherein the service identifier is associated with a service provided by the label-switched path; and identifying a service database based on the service identifier.

2. The method of claim 1, further comprising, in response to determining that the label-switched path is unavailable for forwarding the packet, releasing a local label for the packet.

3. The method of claim 2, wherein releasing the local label comprises: initiating a timer in response to determining the unavailability; and in response to detecting a release condition based on the timer, releasing the local label.

4. The method of claim 1, further comprising: determining the unavailability of the label-switched path by receiving a second notification message from a downstream switch on the label-switched path; and obtaining unavailability information, which includes a second ingress label of the packet at the downstream switch, from the second notification message.

5. The method of claim 4, wherein generating the notification message further comprises: incorporating local unavailability information, which includes the ingress label of the packet at the switch, with the obtained unavailability information to generate the collected unavailability information; incrementing a second depth indicator of the second notification message to generate the depth indicator; and including the collected unavailability information and the depth indicator into the notification message.

6. The method of claim 1, further comprising: in response to the switch being an edge switch on the label-switched path, identifying a source address of the inner header in the notification message; and sending an error message indicating the unavailability to the identifier source address.

7. The method of claim 1, further comprising, in response to the switch being an edge switch on the label-switched path, generating an alert for a management system that configures the label-switched network, wherein the alert includes the collected unavailability information in the notification message.

8. The method of claim 1, further comprising: determining a forwarding class for the packet, wherein the forwarding class indicates a class of packets that can be forwarded to a same edge switch; and including information of the forwarding class into the notification message.

9. A computer system in a label-switched network, comprising: a processor; a non-transitory computer-readable storage medium storing instructions, which when executed by the processor causes the processor to perform a method for reporting unavailability in the label-switched network, the method comprising: determining that a label-switched path is unavailable for forwarding a packet; generating a notification message for collecting unavailability information at a respective upstream hop of the label-switched path, wherein the notification message includes: a depth indicator indicating depth of collected unavailability information and an ingress label of the packet at the computer system; a label-switching header of the packet based on which the packet is forwarded on the label-switched path; and an inner header of an inner packet encapsulated in the packet; in response to the computer system being an intermediate node on the label-switched path, forwarding the notification message to an upstream node on the label-switched path, thereby allowing the upstream node to collect further unavailability information in the notification message; and in response to the computer system being an edge switch on the label-switched path, identifying a service identifier of the label-switching header in the notification message, wherein the service identifier is associated with a service provided by the label-switched path; and identifying a service database based on the service identifier.

10. The computer system of claim 9, wherein the method further comprises, in response to determining that the label-switched path is unavailable for forwarding the packet, releasing a local label for the packet.

11. The computer system of claim 10, wherein releasing the local label comprises: initiating a timer in response to determining the unavailability; and in response to detecting a release condition based on the timer, releasing the local label.

12. The computer system of claim 9, wherein the method further comprises: determining the unavailability of the label-switched path by receiving a second notification message from a downstream node on the label-switched path; and obtaining unavailability information, which includes a second ingress label of the packet at the downstream node, from the second notification message.

13. The computer system of claim 12, wherein generating the notification message further comprises: incorporating local unavailability information, which includes the ingress label of the packet at the computer system, with the obtained unavailability information to generate the collected unavailability information; incrementing a second depth indicator of the second notification message to generate the depth indicator; and including the collected unavailability information and the depth indicator into the notification message.

14. The computer system of claim 9, wherein the method further comprises: in response to the computer system being an edge node on the label-switched path, identifying a source address of the inner header in the notification message; and sending an error message indicating the unavailability to the identifier source address.

15. The computer system of claim 9, wherein the method further comprises, in response to the computer system being an edge node on the label-switched path, generating an alert for a management system that configures the label-switched network, wherein the alert includes the collected unavailability information in the notification message.

16. The computer system of claim 9, wherein the method further comprises: determining a forwarding class for the packet, wherein the forwarding class indicates a class of packets that can be forwarded to a same edge node; and including information of the forwarding class into the notification message.

* * * * *